US012651376B2

(12) United States Patent
Wada

(10) Patent No.: US 12,651,376 B2
(45) Date of Patent: Jun. 9, 2026

(54) WORKPIECE DETECTION SYSTEM

(71) Applicant: FANUC CORPORATION, Yamanashi (JP)

(72) Inventor: Jun Wada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 328 days.

(21) Appl. No.: 18/552,945

(22) PCT Filed: Jun. 4, 2021

(86) PCT No.: PCT/JP2021/021454
§ 371 (c)(1),
(2) Date: Sep. 28, 2023

(87) PCT Pub. No.: WO2022/254725
PCT Pub. Date: Dec. 8, 2022

(65) Prior Publication Data
US 2024/0161338 A1 May 16, 2024

(51) Int. Cl.
*G06T 7/73* (2017.01)
*G06T 7/564* (2017.01)

(52) U.S. Cl.
CPC ............... *G06T 7/75* (2017.01); *G06T 7/564* (2017.01); *G06T 2207/10028* (2013.01); *G06T 2207/30164* (2013.01)

(58) Field of Classification Search
CPC ...................... G06T 7/75; G06T 7/564; G06T 2207/100228; G06T 2207/30164
See application file for complete search history.

(56) References Cited

U.S. PATENT DOCUMENTS

2014/0140576 A1    5/2014  Ikeda
2017/0154397 A1*   6/2017  Satou ......................... G06T 7/75
2018/0373959 A1    12/2018 Rhoads et al.
(Continued)

FOREIGN PATENT DOCUMENTS

CN        108537875 A      9/2018
CN        110388880 A     10/2019
(Continued)

OTHER PUBLICATIONS

International Search Report issued in PCT/JP2021/021454; mailed Aug. 31, 2021.

*Primary Examiner* — Stephen R Koziol
*Assistant Examiner* — Michael Kim Maiden
(74) *Attorney, Agent, or Firm* — Studebaker Brackett PLLC

(57) ABSTRACT

A workpiece detection system capable of detecting a workpiece accurately and rapidly comprises: a three-dimensional sensor that measures a three-dimensional shape of an object in a field of view; and an information processing device that uses a visually recognizable shape in each point of view of a three-dimensional model as a search target shape, and, when a matching partial shape that matches the search target shape is found from the three-dimensional shape measured by the three-dimensional sensor, outputs the matching partial shape as a search result. The information processing device excludes a part of the search target shape or a part of the search result on the basis of a preset condition.

10 Claims, 3 Drawing Sheets

(56) References Cited

U.S. PATENT DOCUMENTS

| | | | | |
|---|---|---|---|---|
| 2019/0206135 A1* | 7/2019 | Jiang | ...................... | G06F 3/017 |
| 2019/0228563 A1* | 7/2019 | Maeda | .................. | H04N 23/60 |
| 2020/0363815 A1 | 11/2020 | Mousavian et al. | | |

FOREIGN PATENT DOCUMENTS

| | | | | |
|---|---|---|---|---|
| JP | 2009-129189 | A | | 6/2009 |
| JP | 2010118030 | A | * | 5/2010 |
| JP | 5716433 | B2 | | 5/2015 |
| JP | 2018-097889 | A | | 6/2018 |
| JP | 2018-144167 | A | | 9/2018 |
| JP | 2018144163 | A | * | 9/2018 |
| JP | 2018-195070 | A | | 12/2018 |

* cited by examiner

WORKPIECE DETECTION SYSTEM

TECHNICAL FIELD

The present invention pertains to a workpiece detection system.

BACKGROUND ART

For example, in, inter alia, a robot handling system that takes out a workpiece that is randomly supplied, there is usage of a workpiece detection system that obtains a three-dimensional shape of a target region using a three-dimensional sensor, and uses a matching process for identifying a matching partial shape that matches the shape of a three-dimensional model to thereby identify a position and direction of the workpiece.

There is a risk that such a three-dimensional shape matching process will have a very high compute load, and the process will take time if a high-performance arithmetic device is not used. Accordingly, extracting a planar portion from among a target three-dimensional shape, and confirming a degree of matching between the shape of the extracted planar portion and the shape of a plane on the workpiece to thereby detect a workpiece is proposed (for example, refer to Patent Document 1).

Patent Document 1: Japanese Unexamined Patent Application, Publication No. 2018-97889

DISCLOSURE OF THE INVENTION

Problems to be Solved by the Invention

In a case where features of a search target shape for a three-dimensional model are poor or inappropriate, an erroneous matching partial shape may be outputted as a search result. In addition, in a case where a search target shape having poor features or an inappropriate search target shape is used to calculate an erroneous matching partial shape as a search result, this search result cannot be used in subsequent processing, and thus results in wasteful processing time being taken. In addition, there are cases where features of a matching partial shape for a search result are poor due to a single or multiple factors, such as a measurement error or measurement omission by the three-dimensional sensor or the state of the search target shape or features thereof, and there are often erroneous search results in such cases.

Means for Solving the Problems

A workpiece detection system according to one aspect of the present disclosure includes: a three-dimensional sensor configured to measure a three-dimensional shape of an object within a field of view; and an information processing device configured to employ a visually recognizable shape for each viewpoint for a three-dimensional model as a search target shape, search among the three-dimensional shape measured by the three-dimensional sensor for a matching partial shape that matches the search target shape, and output the discovered matching partial shape as a search result. The information processing device, based on a preset condition, excludes one or more of the search target shapes or one or more of the search results.

Effects of the Invention

By virtue of the workpiece detection system according to the present disclosure, it is possible to accurately and rapidly detect a workpiece.

PREFERRED MODE FOR CARRYING OUT THE INVENTION

Figure 1:
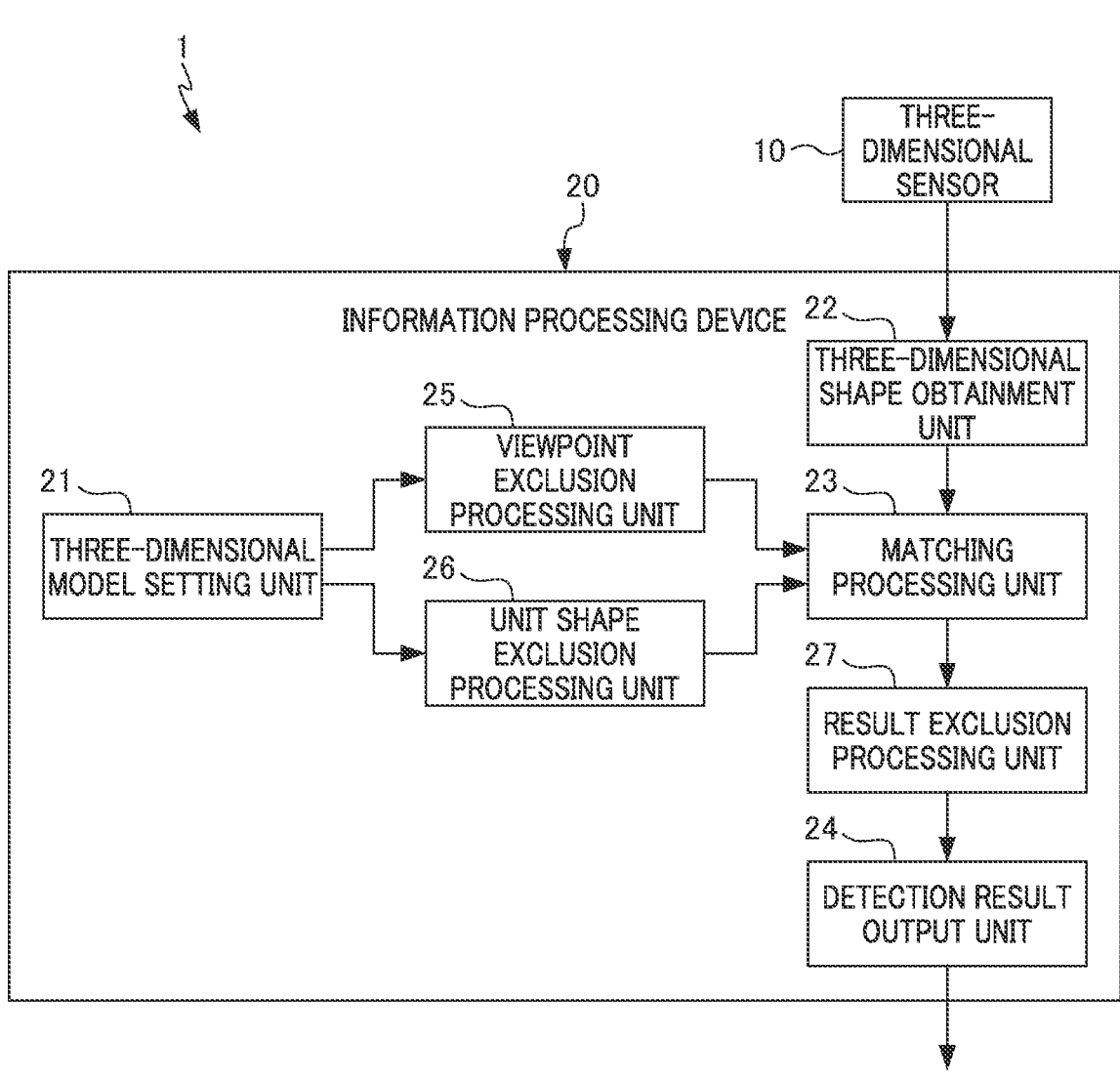
FIG. 1 is a block view that illustrates a configuration of a workpiece detection system according to a first embodiment of the present disclosure.

Description is given below regarding embodiments according to the present disclosure, with reference to the drawings. FIG. 1 is a block view that illustrates a configuration of a workpiece detection system 1 according to a first embodiment of the present disclosure. The workpiece detection system 1 detects a position and an orientation of a workpiece, and outputs the position and orientation of the workpiece to, inter allay a robot control device, for example.

The workpiece detection system 1 is provided with a three-dimensional sensor 10 that measures the three-dimensional shape of an object within a field of view, and an information processing device 20 that sets visually recognizable shapes at respective viewpoints for a preset three-dimensional model as search target shapes, searches from among three-dimensional shapes measured by the three-dimensional sensor 10 for a matching partial shape that matches with a search target shape, and outputs, as a search result, a discovered matching partial shape.

The three-dimensional sensor 10 detects the distance to an object (not just a workpiece, can include an article other than a workpiece, such as a table or a belt conveyor on which, inter alia, a workpiece is placed) present within a field of view for each two-dimensional position within that field of view—in other words for each position within a planar direction orthogonal to a central axis for a measurement range. In other words, the three-dimensional sensor 10 measures the three-dimensional shape of a surface on a side of an object in the field of view that can be visually recognized from the three-dimensional sensor 10. As the three-dimensional sensor 10, at is possible to use, inter alia, a stereo camera or a laser scanner, for example. The measured three-dimensional shape is transmitted to the information processing device 20 as information that enables the creation of a three-dimensional image, such as distance image data or point cloud data, for example.

The information processing device 20, based on a preset condition, excludes one or more search target shapes or one or more search results. As a condition pertaining to exclusion of one or more search target shapes or one or more search results, for example, for example it is possible to give, inter alia, the size of a planar region in a matching partial shape in a measurement result or a visually recognizable shape of a three-dimensional model, or symmetry of shapes belonging to a three-dimensional model.

For example, the information processing device 20 can be realized by causing a computer device having a memory, a processor (CPU), an input/output interface, and the like to execute an appropriate information processing program. The information processing device 20 may also be provided with, inter alia, a display device such as a display panel and an input device such as a keyboard or a touchpad, or may be configured such that information display using an external display device and input of information using an external input device are possible via the input/output interface. In addition, the information processing device 20 may be integrally configured with a computer device that manages the entirety of equipment such as a handling system or a machining system, for example, that uses the workpiece detection system 1, or with a computer device that controls other components within the equipment.

Specifically, it is possible to achieve a configuration in which the information processing device 20 is provided with a three-dimensional model setting unit 21, a three-dimensional shape obtainment unit 22, a matching processing unit 23, a detection result output unit 24, a viewpoint exclusion processing unit 25, a unit shape exclusion processing unit 26, and a result exclusion processing unit 27. These components result from classifying functionality held by the information processing device 20, and do not need to be clearly distinguishable in a physical configuration or a program structure.

The three-dimensional model setting unit 21 sets a three-dimensional model for identifying the three-dimensional shape of a workpiece to be detected. The three-dimensional model of a workpiece can be specified by, inter alia, CAD data, for example. Accordingly, configuration can be taken such that the three-dimensional model setting unit 21 obtains, from the CAD, information regarding a three-dimensional model via a recording medium or communication. In addition, the three-dimensional model setting unit 21 may be provided with functionality for modeling or correcting a three-dimensional model.

The three-dimensional shape obtainment unit 22 obtains data regarding the three-dimensional shape of an object within the field of view of the three-dimensional sensor 10, the data being measured by the three-dimensional sensor 10.

The matching processing unit 23 performs a matching process for searching three-dimensional shapes obtained by the three-dimensional shape obtainment unit 22 for a search target shape, namely visually recognizable shapes for each viewpoint of the three-dimensional model of a workpiece set by the three-dimensional model setting unit 21—in other words searches surface shapes of the three-dimensional model for a matching partial shape that matches the shape of a region which can be visually recognized from a viewpoint—and identifies the position and direction of a matching partial shape that matches the search target shape. As an example, a visually recognizable shape in a case where a columnar three-dimensional model is viewed from a radial direction is a curved surface having a half-pipe shape.

The matching process can be performed by using a method that, while shifting a position a little at a time such that scanning is performed three-dimensionally, repeatedly performs a computation for calculating a degree of matching with respect to the search target shape in relation to a matching partial shape having a predetermined size from among the three-dimensional shape obtained by the three-dimensional shape obtainment unit 22, and determining that there is a match with the search target shape in a case where the degree of matching exceeds a threshold. In a case of discovering a matching partial shape that matches a visually recognizable shape in accordance with a search process, the matching processing unit 23 may use, inter alia, an ICP (Iterative Closest Point) algorithm, for example, to accurately identify the position and direction of the matching partial shape.

The detection result output unit 24 outputs, as a search result, the position and direction of the matching partial shape determined to match the search target shape by the matching processing unit 23 to, inter alia, a robot control device. Regarding one three-dimensional shape obtained by the three-dimensional shape obtainment unit 22, a search result can include a plurality of matching partial shapes. In addition, a search result can include information indicating that a matching partial shape has not been discovered. The detection result output unit 24 is not limited to something that, when a search result is obtained, immediately outputs the search result, and may store the search result and output the search result in response to a request.

The viewpoint exclusion processing unit 25 excludes, from search target shapes, a visually recognizable shape for a viewpoint where the ratio of a projection area of a planar region with respect to a projection area of the entirety of the visually recognizable shape is greater than a predetermined reference value. A planar region is not limited to a complete plane and, for example, can be set to, inter alia, a region in which clearance from a virtual plane is equal to or less than a setting value or a region in which curvature is greater than or equal to a setting value.

Figure 2:
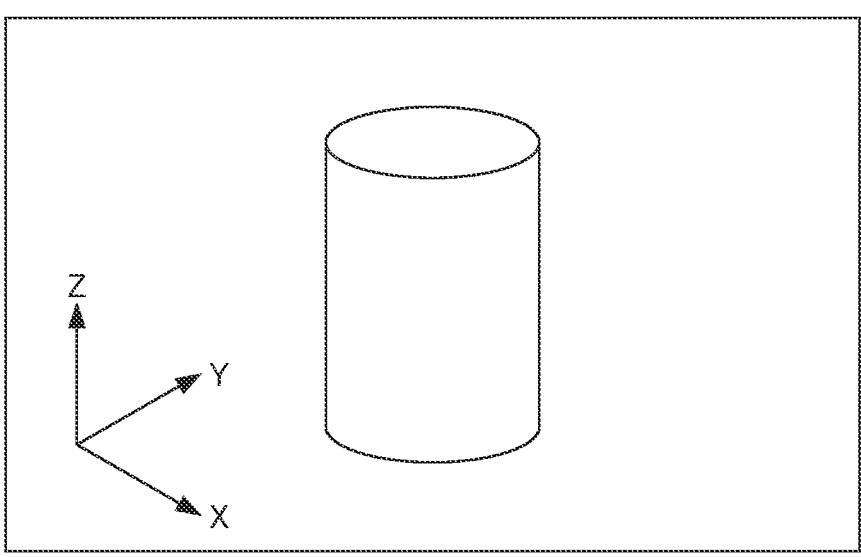
FIG. 2 is a schematic view that illustrates a visually recognizable shape of a columnar three-dimensional model.
Figure 3:
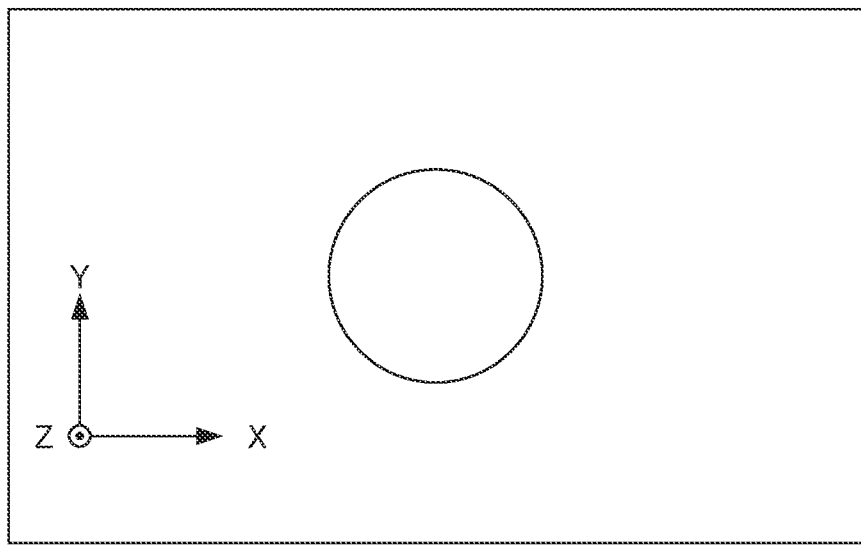
FIG. 3 is a schematic view that illustrates a visually recognizable shape of the three-dimensional model FIG. 2, from a Z direction.
Figure 4:
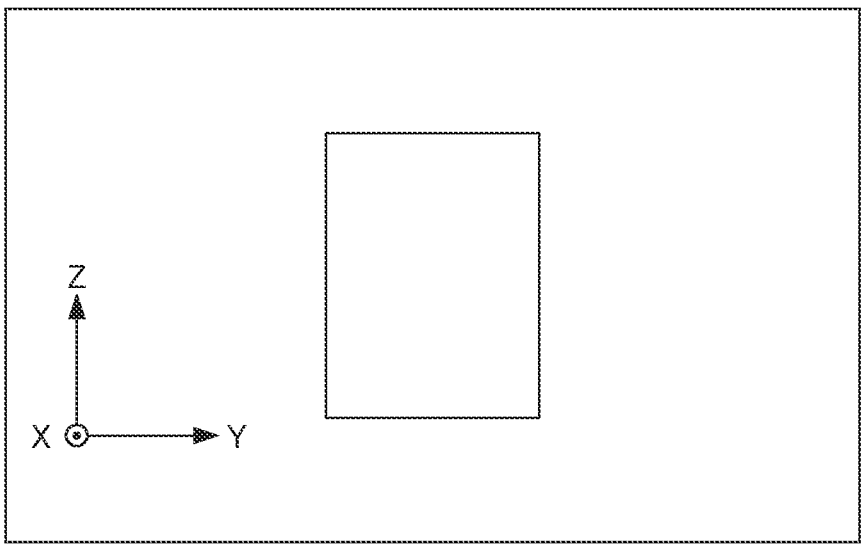
FIG. 4 is a schematic view that illustrates a visually recognizable shape of the three-dimensional model in FIG. 2, from an X direction.

As an example, consider a case where a three-dimensional model for a workpiece that is modeled in XYZ space (Cartesian coordinate space) is a columnar shape that extends in the Z direction as illustrated in FIG. 2. In a case where the three-dimensional model is seen from the Z axis direction, only an end surface which is a plane can be visually recognized, as illustrated in FIG. 3. In this case, the ratio of the projection area of a planar region with respect to the projection area of the entirety of the visually recognizable shape is 100%. Accordingly, the visually recognizable shape in this viewpoint is excluded from search target shapes. In addition, in a case where the three-dimensional model is seen from the X direction as illustrated in FIG. 4 or any direction parallel to the XY plane, the end surfaces thereof cannot be visually recognized and only the cylindrical surface thereof is visually recognized, and thus the projection area ratio for a region that is a complete plane is 0% (the projection area of a planar region defined in accordance with, inter alia, clearance from a virtual plane as described above can be a valid value). In a case where the three-dimensional model is seen from a direction that is inclined with respect to the XY plane, the projection area ratio of the planar region becomes a value between 0% and 100% in accordance with the angle of inclination. The viewpoint exclusion processing unit 25 can be configured to exclude, from search target shapes, a visually recognizable shape for a viewpoint where the projection area ratio for a planar region is equal to or greater than a reference value, in other words a viewpoint where the angle of inclination held by a line-of-sight direction with respect to the XY plane is equal to or greater than a certain angle.

It may be that the viewpoint exclusion processing unit 25 only calculates the projection area ratio for a planar region in the visually recognizable shape of a three-dimensional model, for the largest planar region. In a case where the visually recognizable shape has a plurality of planar regions, there is a very low possibility for there to be a plurality of planar regions due to a measurement error by the three-dimensional sensor 10 and for a positional relationship for this plurality of planar regions to match the positional relationship of the plurality of planar regions be to the visually recognizable shape. Accordingly, if only a visually recognizable shape for which the projection area ratio for the largest planar region is equal to or greater than a reference value is excluded from search target shapes, it is possible to improve processing speed without unnecessarily reducing the probability of being able to detect a workpiece that is actually present (a detection rate).

It is desirable for the viewpoint exclusion processing unit 25 to be configured to provide an interface that enables a user to discretionarily set, inter alia, the reference value for the projection area ratio for planar regions, and a setting value for an index (such as an allowable clearance from an underlying planar region) for determining a planar region. In this case, in order to facilitate a user making an appropriate setting, it is desirable for the viewpoint exclusion processing unit 25 to be configured to be able to output information regarding the visually recognizable shape to be excluded from the search target shapes, for example, configured to be able to display, inter alia, an image, coordinate positions for a viewpoint, or the ratio for the visually recognizable shape to be excluded on a display or the like.

In addition, the viewpoint exclusion processing unit 25 may be configured to exclude, from search target shapes, only those for which the outline of a visually recognizable shape of the three-dimensional model at the viewpoint is not clear, in addition to the projection area ratio for a planar region being greater than the predetermined reference value. The clarity of the outline of a visually recognizable shape can be determined based on a predefined index, such as curvature for an outer edge of the visually recognizable shape or change of a line-of-sight-direction position near the outer edge of the visually recognizable shape, for example. In a case where the clarity of the outline of the visually recognizable shape is high, measurement error at a portion corresponding to an outer edge of the visually recognizable shape in a measurement result by the three-dimensional sensor 10 decreases, and thus it is possible to set the threshold for the degree of matching in the matching processing unit 23 to be high. As a result, even if the degree of matching has become high due to the measurement error for a planar region, it is possible to prevent a misdetection in which this matches a search target shape, and thus this does not need to be excluded from search target shapes.

As an example, in a case where the three-dimensional model of a workpiece is a precise cube, the projection area ratio becomes equal to or greater than ⅓ even with the maximum planar region. However, because the outer edges of a visually recognizable shape are ridgelines between surfaces, the curvature near the outer edges of the visually recognizable shape is infinite, and the rate of change of a line-of-sight-direction position near the outer edges of the visually recognizable shape is constant. Such a visually recognizable shape can be evaluated as having a clear outline, and thus, even if not excluded from search target shapes, the possibility of a misdetection is low. In contrast, in a case where a three-dimensional model of a workpiece has a shape resulting from chamfering the ridgelines and corners of a cube to be rounded, there is a possibility for measurement error for a portion corresponding to the outer edges or a visually recognizable shape to become large when the curvature of the chamfering becomes small, and thus it is not desirable to set the threshold for the degree of matching to be high. With such a three-dimensional model, the curvature for the outer edges of a visually recognizable shape becomes a value that is small to a certain degree, and the rate of change of a line-of-sight-direction position near the outer edges of the visually recognizable shape changes (a second-order derivative value becomes a valid value). Accordingly, based on an index resulting from numerically expressing the outer edge or a feature near the outer edge of such a visually recognizable shape, it is possible to identify where the outline of a visually recognizable shape is not clear and simultaneously add, as a target to be excluded from search target shapes, only that for which the projection area ratio for a planar region is large, whereby ensuring the detection rate and suppressing misdetections are both established while expediting the detection process.

In a case where the shape of a three-dimensional model has a plurality of unit shapes around an axis of symmetry, the unit shape exclusion processing unit 26 excludes one or more unit shapes from visually recognizable shapes that are search target shapes, and typically keeps only one unit shape from among a plurality of unit shapes that are disposed around an axis of symmetry and are symmetric to each other, while excluding other unit shapes. In this manner, by excluding unit shapes from visually recognizable shapes and using search target shapes having a compressed amount of information, it is possible to suppress a compute load for discovering a matching partial shape that matches a search target shape. In addition, duplicate unit shapes are deleted, whereby it is possible to prevent the same shape part from being duplicatively recognized as a plurality of visually recognizable shapes having different start points.

It is desirable for the unit shape exclusion processing unit 26 to be configured such that a user can designate each of a start point and an end point of a unit shape by using two planes that include an axis of symmetry. Specifically, the unit shape exclusion processing unit 26 can be configured to provide a user interface that displays the entire shape of a three-dimensional model while also displaying two planes indicating the start point and the end point of a unit shape and, for example, the user uses a drag operation or the like to cause each plane to rotate around the axis of symmetry. In a case where the three-dimensional model has the shape of a solid of revolution as with a cylinder, for example, division into any number of unit shapes is possible. Accordingly, the size of a unit shape is appropriately selected, whereby it is possible to promptly detect a matching partial shape that matches a search target shape while ensuring sufficient detection accuracy.

The result exclusion processing unit 27 excludes, from search results, a matching partial shape for which the ratio of the projection area of a planar region with respect to the projection area of the entirety, of the matching partial shape is greater than a predetermined reference value, from among matching partial shapes that match a search target shape. In other words, the result exclusion processing unit 27 reconfirms a matching partial shape determined to match a search target shape by the matching processing unit 23, and excludes this from search result in a case where the projection area ratio for a planar region is high. Accordingly, the detection result output unit 34 finally outputs, as detection results, only search results that were not excluded by the result exclusion processing unit 27.

As an example, in a case where there is a prismatic object, even at a time when the matching processing unit 23 has determined that there is a match with a visually recognizable shape of a three-dimensional model having a columnar shape because the three-dimensional sensor 10 was not able to correctly measure the shape of the object, the projection area ratio of a planar region can become significantly greater in comparison to a case where a columnar workpiece is measured. Accordingly, it is possible to prevent a misdetection by using the result exclusion processing unit 27 to exclude, from search results, a matching partial shape for which the projection area ratio for a planar region is high. Note that, in the result exclusion processing unit 27, it may be that the projection area ratio for a planar region is only calculated for the largest plane, similarly to in the viewpoint exclusion processing unit 25.

It may be that, from among matching partial shape having a large projection area of a planar region, the result exclusion processing unit 27 only excludes, from the search results, those for which the degree of matching with a search target shape for an outline region or the outline thereof is less than the reference value. In a case where the degree of matching for the outline region is high even if the ratio for a planar region is large, it is considered that there is a high possibility of a workpiece actually being present. The outline region can be set, as appropriate, but it is possible to set a certain region that is within a certain distance range from positions corresponding to the outer edges of a search target shape, for example.

The result exclusion processing unit 27 may be configured to provide an interface that enables a user to set, inter alia, the projection area ratio for a planar region of a matching partial shape to exclude from search results, or the degree of matching for an outline region. In addition, it is desirable for configuration to be taken such that the result exclusion processing unit 27 can provide an interface that can output information regarding a matching partial shape that is excluded from search results, typically a screen display. A user can confirm a matching partial shape that has actually been excluded, whereby a setting value for excluding from search results can be easily optimized.

Description is given above regarding an embodiment of the present disclosure, but the present invention is not limited to the embodiment described above. In addition, effects set forth in the embodiment described above merely list the most suitable effects that arise from the present invention. Effects due to the present invention are not limited to those set forth in the embodiment described above.

In the workpiece detection system according to the present disclosure, it is sufficient if the information processing device can, based on a preset condition, exclude one or more search target shapes or one or more search results, and it may be that the information processing device does not have one or more or all of the viewpoint exclusion processing unit, unit shape exclusion processing unit, and result exclusion processing unit which are in the embodiment described above.

EXPLANATION OF REFERENCE NUMERALS

1 Workpiece detection system
10 Three-dimensional sensor
20 Information processing device
21 Three-dimensional model setting unit
22 Three-dimensional shape obtainment unit
23 Matching processing unit
24 Detection result output unit
25 Viewpoint exclusion processing unit
26 Unit shape exclusion processing unit
27 Result exclusion processing unit

The invention claimed is:

1. A workpiece detection system, comprising:
a three-dimensional sensor configured to measure a three-dimensional shape of an object within a field of view; and
an information processing device configured to employ a visually recognizable shape for each viewpoint for a three-dimensional model as a search target shape, search among the three-dimensional shape measured by the three-dimensional sensor for a matching partial shape that matches the search target shape, and output the discovered matching partial shape as a search result, wherein
the information processing device excludes one or more of the search target shapes or one or more of the search results, based on a size of a planar region in the matching partial shape or the visually recognizable shape, and
the information processing device has a viewpoint exclusion processing unit configured to exclude, from the search target shapes, the visually recognizable shape for a viewpoint at which a ratio of a projection area of the planar region with respect to a projection area of an entirety of the visually recognizable shape is greater than a predetermined reference value.

2. The workpiece detection system according to claim 1, wherein
the viewpoint exclusion processing unit excludes, from the search target shapes, the visually recognizable shape for the viewpoint only in a case where an outline of the visually recognizable shape is not clear.

3. The workpiece detection system according to claim 1, wherein
the ratio of the projection area of the planar region in the visually recognizable shape is calculated only for a largest plane.

4. The workpiece detection system according to claim 1, wherein
the viewpoint exclusion processing unit is configured to be able to output information regarding the visually recognizable shape to be excluded from the search target shapes.

5. A workpiece detection system, comprising:
a three-dimensional sensor configured to measure a three-dimensional shape of an object within a field of view; and
an information processing device configured to employ a visually recognizable shape for each viewpoint for a three-dimensional model as a search target shape, search among the three-dimensional shape measured by the three-dimensional sensor for a matching partial shape that matches the search target shape, and output the discovered matching partial shape as a search result, wherein
the information processing device excludes one or more of the search target shapes or one or more of the search results, based on a size of a planar region in the matching partial shape or the visually recognizable shape, and
the information processing device has a result exclusion processing unit configured to exclude, from the search results, the matching partial shape, from among the matching partial shapes that match the search target shapes, for which a ratio of a projection area of the planar region with respect to a projection area of an entirety of the matching partial shape is greater than a predetermined reference value.

6. The workpiece detection system according to claim 5, wherein the result exclusion processing unit excludes, from the search results, only, from among the matching partial shapes that match the search target shapes, the matching partial shape for which a degree of matching with the search target shape for an outline region thereof is less than a reference value.

7. The workpiece detection system according to claim 5, wherein the ratio of the projection area of the planar region in the matching partial shape is calculated only for a largest plane.

8. The workpiece detection system according to claim 5, wherein the result exclusion processing unit is configured to be able to output information regarding the matching partial shape excluded from the search results.

9. A workpiece detection system, comprising:

a three-dimensional sensor configured to measure a three-dimensional shape of an object within a field of view; and an information processing device configured to employ a visually recognizable shape for each viewpoint for a three-dimensional model as a search target shape, search among the three-dimensional shape measured by the three-dimensional sensor for a matching partial shape that matches the search target shape, and output the discovered matching partial shape as a search result, wherein the information processing device, based on a preset condition, excludes one or more of the search target shapes or one or more of the search results, and the information processing device has a unit shape exclusion processing unit configured to, in a case where a shape of the three-dimensional model has a plurality of unit shapes around an axis of symmetry, exclude one or more of the unit shapes from the visually recognizable shapes for the search target shapes.

10. The workpiece detection system according to claim 9, wherein the unit shape exclusion processing unit is configured such that a user can use two planes that include the axis of symmetry to designate each of a start point and an end point of the unit shape.

* * * * *